(12) United States Patent
Wu et al.

(10) Patent No.: US 9,965,415 B2
(45) Date of Patent: May 8, 2018

(54) DRAM DATA PATH SHARING VIA A SPLIT LOCAL DATA BUS AND A SEGMENTED GLOBAL DATA BUS

(71) Applicant: INTEL CORPORATION, Santa Clara, CA (US)

(72) Inventors: Wei Wu, Portland, OR (US); Shigeki Tomishima, Portland, OR (US); Shih-Lien L. Lu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 119 days.

(21) Appl. No.: 14/975,293

(22) Filed: Dec. 18, 2015

(65) Prior Publication Data

US 2017/0177519 A1    Jun. 22, 2017

(51) Int. Cl.
*G06F 13/28* (2006.01)
*G06F 13/16* (2006.01)
*G06F 13/40* (2006.01)

(52) U.S. Cl.
CPC .......... *G06F 13/28* (2013.01); *G06F 13/1668* (2013.01); *G06F 13/4027* (2013.01)

(58) Field of Classification Search
CPC ..................... G06F 13/4027; G06F 13/4022
See application file for complete search history.

(56) References Cited

U.S. PATENT DOCUMENTS

| | | | |
|---|---|---|---|
| 5,822,261 A | 10/1998 | Suh | |
| 5,831,924 A * | 11/1998 | Nitta | G11C 8/14 365/189.17 |
| 6,144,577 A | 11/2000 | Hidaka | |
| 6,442,078 B1 * | 8/2002 | Arimoto | G11C 7/10 365/189.08 |
| 6,754,120 B1 * | 6/2004 | Bellows | G11C 7/06 365/205 |
| 6,825,836 B1 * | 11/2004 | Stewart | G09G 3/3688 345/212 |
| 2002/0054525 A1 * | 5/2002 | Eto | G11C 5/025 365/201 |
| 2004/0073745 A1 | 4/2004 | Ma et al. | |
| 2004/0170075 A1 | 9/2004 | Suh | |
| 2005/0047255 A1 | 3/2005 | Park et al. | |

(Continued)

FOREIGN PATENT DOCUMENTS

WO    20060019870    2/2006

OTHER PUBLICATIONS

International Search Report and Written Opinion for International Application No. PCT/US2016/062834, dated Mar. 3, 2017, 16 pp. [77.326PCT (ISR & WO)].

(Continued)

*Primary Examiner* — Farley Abad
(74) *Attorney, Agent, or Firm* — Konrad Raynes Davda & Victor LLP; Rabindranath Dutta (57) ABSTRACT

Provided are a memory device and a memory bank comprising a split local data bus, and a segmented global data bus coupled to local data bus. Provided also is a method comprising, receiving a signal from a split local data bus, and transmitting the signal to a segmented global data bus coupled to local data bus. Provided also is a computational device that includes the memory device and the memory bank, and optionally one or more of a display, a network interface, and a battery.

25 Claims, 8 Drawing Sheets

(56) References Cited

U.S. PATENT DOCUMENTS

| | | |
|---|---|---|
| 2005/0289409 A1 | 12/2005 | Smola et al. |
| 2007/0071130 A1 | 3/2007 | Saito et al. |
| 2007/0073980 A1 | 3/2007 | Chung |
| 2008/0048727 A1 | 2/2008 | Yuan et al. |
| 2008/0278991 A1 | 11/2008 | Kajigaya |
| 2008/0291763 A1 | 11/2008 | Mori et al. |
| 2009/0019199 A1 | 1/2009 | Chun |
| 2012/0284552 A1 | 11/2012 | Archer, Jr. et al. |
| 2013/0337646 A1 | 12/2013 | Cernea et al. |

OTHER PUBLICATIONS

International Search Report and Written Opinion for International Application No. PCT/US2016/062849, dated Mar. 9, 2017, 12 pp. [77.332PCT (ISR & WO)].

International Search Report and Written Opinion for International Application No. PCT/US2016/062853, dated Mar. 9, 2017, 13 pp. [77.333PCT (ISR & WO)].

Davis, B.T., "Modem DRAM Architectures", Dissertation, University of Michigan, 2001, 236 pp.

JEDEC Solid State Technology Association, "DDR4 SDRAM", JEDEC Standard, JESD79-4, Sep. 2012, 214 pp.

JEDEC Solid State Technology Association, "High Bandwidth Memory (HBM) DRAM", JEDEC Standard, JESD235, Oct. 2013, 124 pp.

JEDEC Solid State Technology Association, "Low Power Double Data Rate 4 (LPDDR4)", JEDEC Standard, JESD209-4, Aug. 2014, 196 pp.

JEDEC Solid State Technology Association, "Wide I/O 2 (WideIO2)", JEDEC Standard, JESD229-2, Aug. 2014, 116 pp. [Submitted as Parts A, B, and C due to EFS-Web file size restrictions].

Techopedia, "Dynamic Random Access Memory (DRAM)", [online], [Retrieved on Nov. 20, 2015], Retrieved from the Internet at <URL: https://www.techopedia.com/definition/2770/dynamic-random-access-memory-dram>, 2 pp.

Yoo, J., et al., "A 32-Bank 1 GB Self-Strobing Synchronous DRAM with 1 GByte/s Bandwidth", IEEE Journal of Solid-State Circuits, vol. 31, No. 11, Nov. 1996, 10 pp.

U.S. Appl. No. 14/975,298, "DRAM Data Path Sharing Via a Split Local Data Bus", by W. Wu et al., filed Dec. 18, 2015, 30 pp. (77.332 (Appln)).

U.S. Appl. No. 14/975,305, "DRAM Data Path Sharing Via a Segmented Global Data Bus", by W. Wu et al., filed Dec. 18, 2015, 32 pp. (77.326 (Appln)).

Office Action 1 for U.S. Appl. No. 14/975,305, dated Aug. 2, 2017, 20 pp. [77.326 (OA1)].

Office Action 1 for U.S. Appl. No. 14/975,298, dated Jun. 29, 2017, 19 pp. [77332 (OA1)].

Response to Office Action 1 for U.S. Appl. No. 14/975,298, dated Sep. 29, 2017, 12 pp. [77.332 (ROA1)].

Response to Office Action 1 for U.S. Appl. No. 14/975,305, dated Nov. 2, 2017, 9 pp. [77.326 (ROA1)].

Final Office Action 1 for U.S. Appl. No. 14/975,305, dated Jan. 12, 2018, 14 pp.

Notice of Allowance 1 for U.S. Appl. No. 14/975,298, dated Nov. 22, 2017, 15 pp.

U.S. Appl. No. 15/940,811, entitled "Dram Data Path Sharing Via a Split Local Data Bus", filed Mar. N, 2018, Invented by W. Wu et al., 30 pp.

Response to Final Office Action 1 for U.S. Appl. No. 14/975,305, dated Mar. 23, 2018, 10 pp.

\* cited by examiner

DRAM DATA PATH SHARING VIA A SPLIT LOCAL DATA BUS AND A SEGMENTED GLOBAL DATA BUS

BACKGROUND

Dynamic Random Access Memory (DRAM) is a data storage device that is used in many different types of computational devices. Some DRAM chips are comprised of rectangular arrays of memory cells referred to as banks. Each bank has support logic that is used for reading and writing data in the bank, and refresh circuitry to maintain the integrity of the data stored in the bank. The banks may operate independently but may share command, address, and data pins. Each bank may be comprised of a hierarchical structure with rectangular arrays of memory cells. The contents stored in memory cells are addressed via word lines and bit lines. The intersection of a word line and a bit line constitutes the address of a memory cell.

BRIEF DESCRIPTION OF THE DRAWINGS

Referring now to the drawings in which like reference numbers represent corresponding parts throughout.

DETAILED DESCRIPTION

In certain DRAM chip architectures, when cells are sensed by bitline sense amplifiers, the sensed values are propagated to a local data bus, and then they are propagated through switches to a global data bus. The two data buses may extend in orthogonal directions and across an entire bank of the DRAM chip. No matter how far or close a cell is located from global sense amplifiers, the entire data path is occupied as the global sense amplifiers are all connected to one end of the global data bus. This is inefficient in terms of area utilization in the DRAM chip, as for about approximately 50% of the time, about half of the data path is idle. It is also timing inefficient because for the other approximately 50% of the time, the signal has to cross a long distance to reach the global sense amplifiers.

As the workload and speed of computer systems increase, higher bandwidth may be desirable in DRAMs. For increasing the bandwidth of DRAMs, certain embodiments address the routing of global input/output (IO) and local IO within the DRAM architecture. Although various embodiments are described with respect to DRAM, embodiments can be applied to any memory devices or devices that propagate values.

One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three dimensional crosspoint memory device, or other byte addressable nonvolatile memory devices. In one embodiment, the memory device can be or include memory devices that use chalcogenide phase change material (e.g., chalcogenide glass), multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, a spintronic magnetic junction memory based device, or a combination of any of the above, or other memory.

Descriptions herein referring to a "DRAM" can apply to any memory device that allows random access, whether volatile or nonvolatile. The memory device or DRAM can refer to the die itself and/or to a packaged memory product.

In certain embodiments, a split local data bus and a segmented global data bus are implemented in a DRAM device to double the prefetch width without increasing the number of tracks of the local data bus or the global data bus.

In the following description, reference is made to the accompanying drawings which form a part hereof and which illustrate several embodiments. It is understood that other embodiments may be utilized and structural and operational changes may be made.

Figure 1:
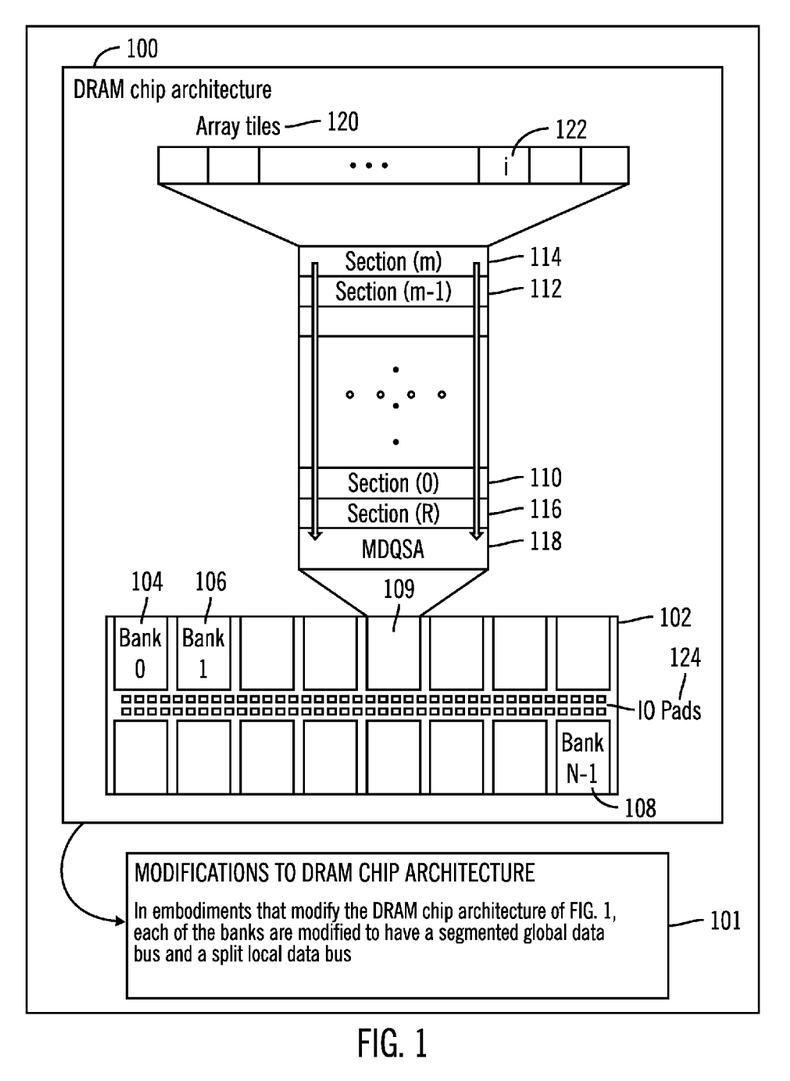
FIG. 1 illustrates a block diagram of a DRAM chip architecture and certain modifications to the DRAM chip architecture, in accordance with certain embodiments.

FIG. 1 illustrates a block diagram that shows a DRAM chip architecture 100 and certain modifications to the DRAM chip architecture (shown via reference numeral 101), in accordance with certain embodiments. The organization of memory banks in the DRAM chip architecture 100 is shown in a DRAM chip 102. The DRAM chip 102 is comprised of a plurality of banks numbered from 0 to (N−1), where Bank 0, Bank 1, and Bank 'N−1' are shown via reference numerals 104, 106, 108 respectively.

Each bank is comprised of a plurality of sections that may be referred to as sub-banks or sub-arrays. In FIG. 1, an exemplary bank 109 is shown to have sections 0 . . . , (m−1), m, wherein section 0, section (m−1), and section (m) are shown via references numerals 110, 112, 114 respectively. In addition to the sections 0 . . . m−1, m, the bank 109 is also comprised of a redundant section (R) 116 and circuitry for a main data queue sense amplifier (MDQSA) 118, where the MDQSA is a global sense amplifier that senses and amplifies signals.

Each of the sections 110 . . . 114 are comprised of a plurality of array tiles 120, where an exemplary array tile 'i' is shown via reference numeral 122.

In the DRAM chip architecture 100, the banks 0 . . . (N−1) are shown in a certain configuration relative to the input/output (IO) pads 124. In the DRAM chip architecture 100, each bank is shown to have one MDQSA. Block 101 of FIG. 1 shows certain modifications that may be made to the DRAM chip architecture 100. In certain embodiments that modify the DRAM chip architecture 100 (the modifications are indicated via reference numeral 101), In embodiments that modify the DRAM chip architecture of FIG. 1, each of the banks are modified to have a segmented global data bus and a split local data bus.

Therefore, FIG. 1 shows a DRAM chip architecture with a plurality of banks, each of which has a number of sections. Each section is segmented into a plurality of array tiles.

Figure 2:
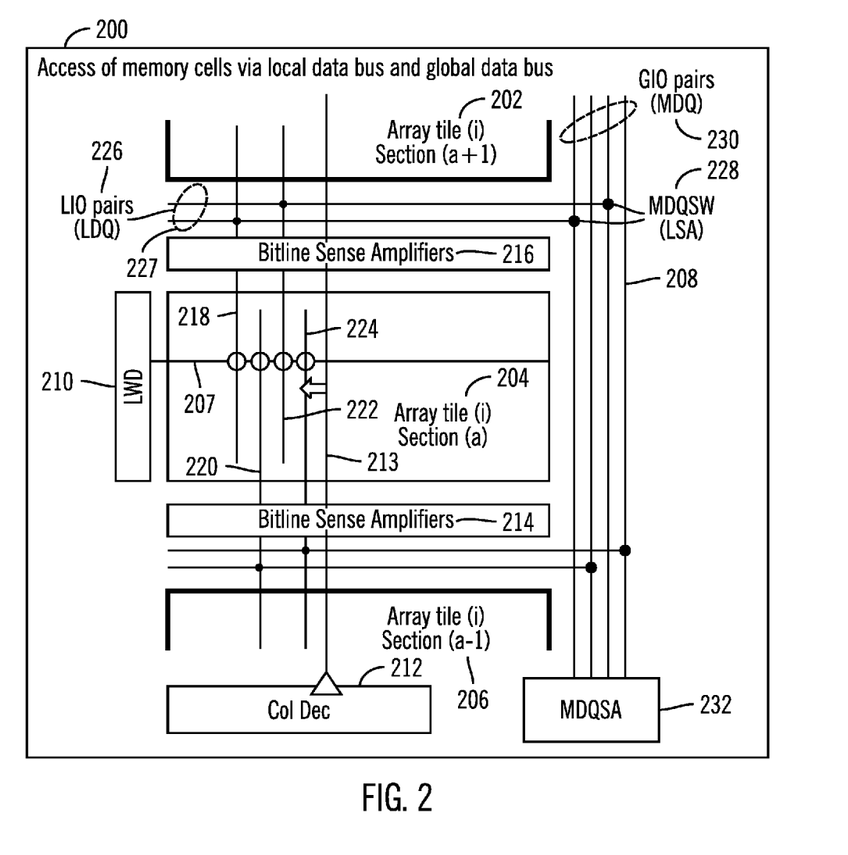
FIG. 2 illustrates a block diagram that shows access of memory cells via local data bus and global data bus, in accordance with certain embodiments.

FIG. 2 illustrates a block diagram 200 that shows access of memory cells via local data bus and global data bus, in accordance with certain embodiments. FIG. 2 shows array tile (i) (shown in FIG. 1 via reference numeral 122) of sections (a+1), a, and (a−1) via reference numerals 202, 204, 206. Thus in FIG. 2, the array tile (i) corresponding to three consecutive sections of a bank of the DRAM chip 102 are shown.

In FIG. 2, the horizontal lines show word lines and the vertical lines show bit lines. For example, reference numeral 207 shows an exemplary word line, and reference numeral 208 shows an exemplary bit line. In order to perform a prefetch, a local word line driver (LWD) 210 is activated and the column decoder 212 selects (via a column select line (CSL) 213) one or more bits from the word line.

The bitline sense amplifiers (BLSA) 214, 216 sense and amplify signals on the bit lines. Bitline sense amplifiers 216 are used in between section a and section (a+1), and bitline sense amplifiers 214 are used in between section (a−1) and section a. Bitline sense amplifiers, positioned above a section and a below a section, sense and amplify alternating bit lines. For example, if the bitline sense amplifiers 216 are used for even numbered bit lines, then the bitline sense amplifiers 214 are used for odd numbered bit lines. In FIG. 2, the bitline sense amplifiers 214 are used to sense and amplify signals in even numbered bit lines 220, 224 and the bitline sense amplifiers 216 are used to sense and amplify signals in odd numbered bit lines 218, 222. Each bitline sense amplifier is shared between two sections and if used for one section, the bitline sense amplifier is not used at the same time for another section.

When cells are sensed by bitline sense amplifiers, the sensed values are connected to a local data bus (LDQ or local data queue) 226 and then through switches, referred to as main data queue switch (MDQSW) 228, the sensed values are connected to the global data bus, referred to as main data queue (MDQ) 230. LDQ 226 may be referred to as local input/output (LIO) pair and the MDQ 230 may be referred to as global input/output (GIO) pair. The MSQSW 228 is shared by all sections whereas LDQ 226 is shared by two sections. The dotted oval 227 shows the two lines of the LDQ 226, where the two lines of the LDQ 226 are shared by section (a) and section (a+1), and the MDQSW 228 is shared by sections (a−1), section (a), section (a+1) and other sections not shown explicitly in FIG. 2.

Since the signals travel over long paths of the MDQ, main data queue sense amplifiers (MDQSA) 232 may be used to sense and amplify signals on the MDQ 230. Therefore, a local bus (shown via horizontal lines) is associated with each section and the MDQSW 228 determines, for the global data bus, where the signal is coming from.

Therefore, in FIG. 2, each array tile has a local word line driver. After a word line is activated, the column decoder 212 may trigger column select (CSL) to decide which bits should access the local IO bus (LDQ) 226. To pursue the smaller cell size, open-bitline architecture may be used in high-density memory cell array. There are two sets of BLSA 214, 216, one on the top and one at the bottom of a selected array tile. The horizontal LDQs are then connected to vertical global IO pairs (MDQ) 230 through the switches and local sense amplifiers referred to as MDQSW or LSA 228.

As illustrated in FIG. 2, to access 4 bits from an array tile uses 4 LDQ tracks (each track has two signal lines) and 4 MDQ tracks. In some architectures, the multiple MDQs may be allocated at both sides of the array tile or even stretch across two array tiles. However, the number of tracks is the same as shown in FIG. 2. It may be noted, that usually one column select operation selects 8 bits but for illustrative purposes FIG. 2 shows 4 bits being selected. Embodiments may use any number of bits for input/output.

Figure 3:
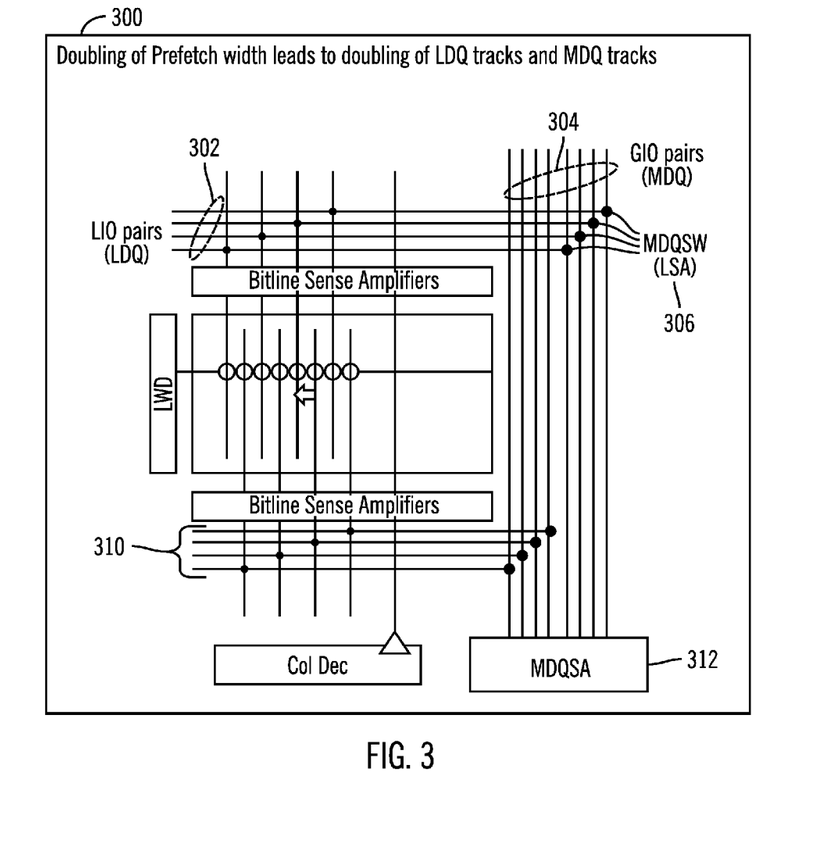
FIG. 3 illustrates a block diagram that shows that when prefetch width doubles then the number of local data bus tracks and the number of global data bus tracks double, in accordance with certain embodiments.

FIG. 3 illustrates a block diagram 300 that shows that when prefetch width doubles (in comparison to FIG. 2) then the number of LDQ tracks and the number of MDQ tracks double, in accordance with certain embodiments. For example, it can be seen that there are 4 tracks in the upper LDQ 302 and 4 tracks in the lower LDQs 310. Eight signals are directed downwards via the MDQ lines 304 to the MDQSA 312. This is not a desirable situation because the doubling of prefetch width leads to a doubling (in comparison to FIG. 2) of the number of tracks of the local data bus and the global data bus.

Figure 4:
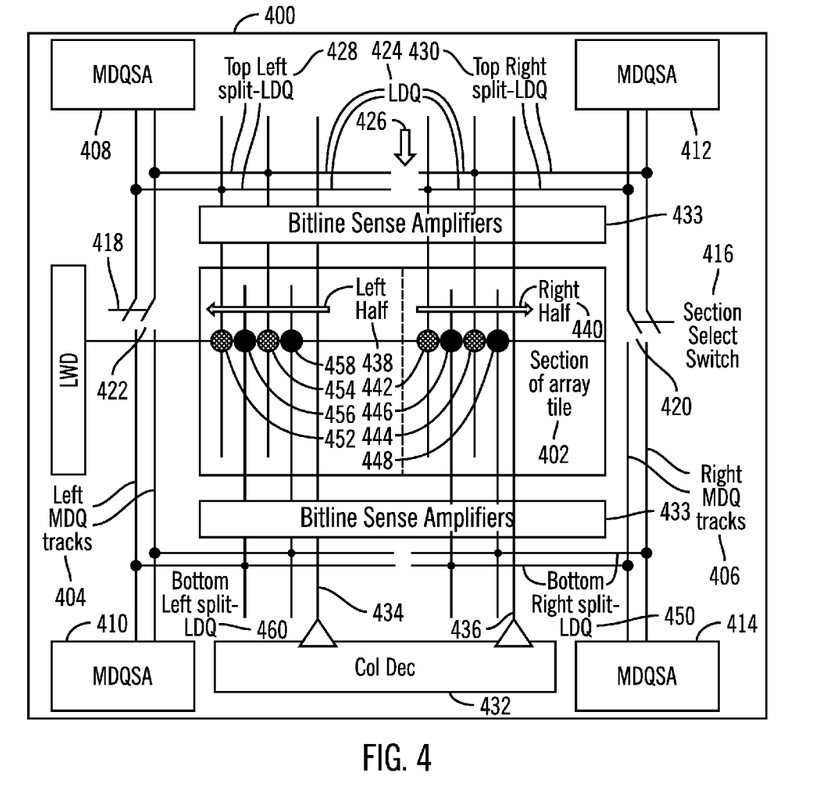
FIG. 4 illustrates a block diagram that shows a split local data bus and a segmented global data bus with sense amplifiers at each end, in which even if the prefetch width doubles, the number of local data bus tracks and the number of global data bus tracks remain unchanged, in accordance with certain embodiments.

FIG. 4 illustrates a block diagram 400 that shows a split local data bus and a segmented global data bus with sense amplifiers at each end, in which even if the prefetch width doubles, the number of local data bus tracks and the number of global data bus tracks remain unchanged, in accordance with certain embodiments.

In the architectures shown in FIGS. 2 and 3, the local data bus and the global data bus convey data along the entirety of the tracks of the local data bus and the global data bus. In FIG. 4, the local data bus is physically split into two parts. The global data bus is also configurable to be split via a section select switch that is inserted in the global data bus adjacent to each section of the memory bank. Additionally the tracks of the global data bus are distributed, such that the global data bus has tracks to the left of each section of the memory bank and to the right of each section of the memory bank. Sense amplifiers are placed at each end of the global data bus tracks. The configuration shown in FIG. 4 allows prefetch width to be doubled in comparison to the architecture of FIGS. 1 and 2, without doubling the number of local data bus tracks and the number of global bus tracks, where the doubling of the number of local data bus tracks and the doubling of the number of global data bus tracks was shown in FIG. 3. In particular, the prefetch width is doubled in the architecture shown in FIG. 4 without changing the number of tracks in the local data bus and the global data bus. Additionally, in the architectures shown in FIGS. 2 and 3, the global sense amplifiers are all connected to one end of the global data bus. In the architecture shown in FIG. 4, sense amplifiers are placed in both ends of the global data bus. In FIG. 4, an 8 bit prefetch is shown by using 4 global data bus tracks, and 4 local data bus tracks.

In FIG. 4, four tracks of the MDQ (global data bus) are distributed to the left and right of each array tile of a section, such as to the left and right of an array tile of a section 402. The left MDQ tracks are shown via reference numeral 404 and the right MDQ tracks are shown via reference numeral 406. There are two left MDQ tracks 404 (referred to as left MDQ) and two right MDQ tracks 406 (referred to as right MDQ).

Figure 6:
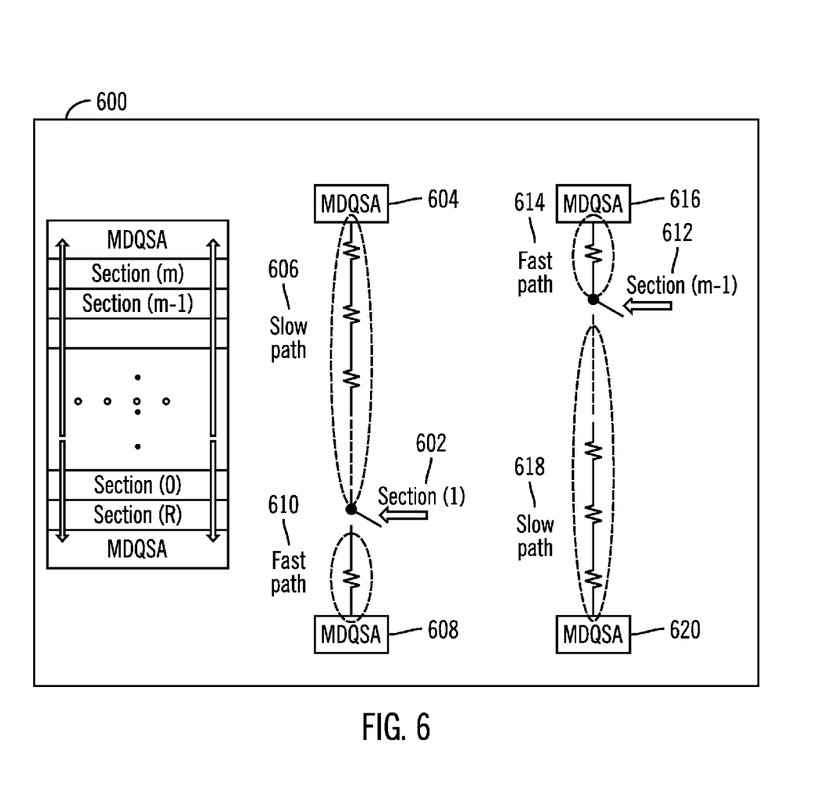
FIG. 6 illustrates a block diagram that shows how an entire global data bus line provides a slow path and a fast path for data, in accordance with certain embodiments.

Global sense amplifiers (MDQSA) 408, 410 are placed on both ends of the left MDQ 414. Global sense amplifiers (MDQSA) 412, 414 are also placed on both ends of the right MDQ 406. A switch 416 is inserted in the right MDQ tracks 406 and a switch 418 is inserted in the left MDQ tracks 404. These switches 416, 418 are controlled by Global Row Address (RA), which selects the section for transmission of signal. In FIG. 4, the switch 416 may be used to break the right MDQ tracks 406 adjacent to a section into two groups by dividing the right MDQ tracks 406 into two segments at the location indicated via reference numeral 420. Similarly, the switch 418 may be used to break the left MDQ tracks 404 adjacent to a section into two groups by dividing the left MDQ tracks 404 into two segments at the location indicated via reference numeral 422. The locations of divisions at 420 and 422 could be half way between two MDQSA, although other locations can be used. For example, description with regard to FIG. 6 provides at least some examples of locations of divisions at 420 and 422.

Therefore, the switches 416, 418 break each of the MDQs tracks 404, 406 into two segments that are not connected. As a result, 4 bits of information may be sent at the same time along different paths on the 2 lines of the left MDQ 404, and 4 bits of information may be sent at the same time along different paths on the 2 lines of the right MDQ 406. Splitting a global data bus (MDQ) sends signal upwards and downwards, or along electrically isolated lines, at the same time. As a result, in FIG. 4 the output data is doubled without changing the number of lines of the global data bus that was shown in FIG. 2. Although, reference is made to upwards and downwards, other directions can be used.

In the architectures shown in FIGS. 2 and 3, an LDQ extends all the way from one end of an array tile to the other end of the array tile. In FIG. 4, the LDQ 424 is physically split (shown via the dark arrow indicated via reference numeral 426) into two parts (e.g., by splitting the LDQ 424 in the middle of the LDQ 424), and one half of the MDQ lines are placed to the left (shown via reference numeral 404) and the other half of the MDQ tracks are placed to the right (shown via reference numeral 406). In certain embodiments, instead of splitting the LDQ 424 in the middle of the LDQ 424 to divide the LDQ into two equal parts, the LDQ 424 may be split at locations other than the middle of the LDQ 424. The left part of the LDQ that is referred to the left split-LDQ 428 connects to the left MDQ 404, and the right part of the LDQ that is referred to as the right split-LDQ 430 connects to the right MDQ 406. In the architecture shown in FIG. 4, when the split of the LDQ is in the middle of the LDQ (i.e., the left part and the right part of the LDQ are halves) the average distance from the BLSA 433 to an MDQ line is halved in comparison to the architecture shown in FIG. 3. Reference herein to half or halves can refer to a portion less than or greater than a half. The left and right halves can be other portions that add up to a whole.

In order to support the architecture shown in FIG. 4, data is read or written in parallel via the left split-LDQ 428 and the right split-LDQ 430. The column decoder 432 sends two sets of column select signals (CSL) 434, 436, one set to select data for transmission along the left split-LDQ 428 and the other set to select data for transmission along the right split-LDQ 430. For example, CSL signals 434 select the left half 438 of the word lines and CSL signals 436 select the right half 440 of the word lines.

As the MDQ 406 is separated into two groups because of the segmentation of the MDQ 406 at location 420 made by the switch 416, the LDQ signals coming from the top BLSA 433 and the bottom BLSA 443 may proceed to different directions and may share the same MDQ track without overlapping. For example, the memory cells 442, 444 (indicated via cross hatching) show signals proceeding in the upward direction, and then proceeding to the right split LDQ 430, and then proceeding along the upward direction of the right MDQ 406 to the MDQSA 412, whereas the memory cells 446, 448 (indicated via dark shading) show signals proceeding in the downward direction, and then proceeding to the right split LDQ 450, and then proceeding along the downward direction of right MDQ 406 to the MDQSA 414.

Similarly the memory cells 452, 454 (indicated via cross hatching) show signals proceeding in the upward direction and then proceeding to the left split LDQ 428 and then along the upward direction of left MDQ 404 to the MDQSA 408, whereas the memory cells 456, 458 (indicated via dark shading) show signals proceeding in the downward direction and then proceeding to the left split LDQ 460 and then along the downward direction of left MDQ 404 to the MDQSA 410.

Therefore, in FIG. 4, 8-bit prefetch is performed by sending two bits of data via each of the four MDQSAs 408, 410, 412, 414, by having the bits of data proceed along split LDQs and then along MDQs segmented by a switch. Therefore, FIG. 4 illustrates certain embodiments in which by physically splitting the LDQ into two parts (e.g., halves) and sending data in parallel through the two parts (e.g., halves) of the LDQ to MDQs placed on both sides of array tiles (where the MDQ tracks have been segmented at locations adjacent to a section via a section switch), the prefetch width may be doubled without increasing the number of LDQ tracks or the number of MDQ tracks. It may be seen that 8 bits of data are transmitted in parallel as follows:

(a) two bits of data from the top left split-LDQ 428 are transmitted via the left MDQ 404 in the upward direction;
(b) two bits of data from the bottom left split-LDQ 460 are transmitted via the left MDQ 404 in the downward direction;
(c) two bits of data from the top right split-LDQ 430 are transmitted via the right MDQ 406 in the upward direction; and
(d) two bits of data from the bottom right split-LDQ 450 are transmitted via the right MDQ 406 in the downward direction.

Therefore, certain embodiments separate the LDQ signals, by separating MDQSAs on both ends of the left MDQ and the right MDQ. The signals from top BLSA 433 go to the top MDQSAs 408, 412, and signals from bottom BLSA 443 go to the bottom MDQSAs 410, 414 based on the operations of the switches 416, 418 inserted in the MDQs 404, 406 and the directing of data by the CSLs 434, 436 via the split LDQs 428, 430, 450, 460.

Therefore, FIG. 4 illustrates certain embodiments in which the prefetch width may be doubled in the architecture shown in FIG. 2, without changing the number of local data bus (LDQ) tracks, and without changing the number of global data bus (MDQ) tracks.

Figure 5:
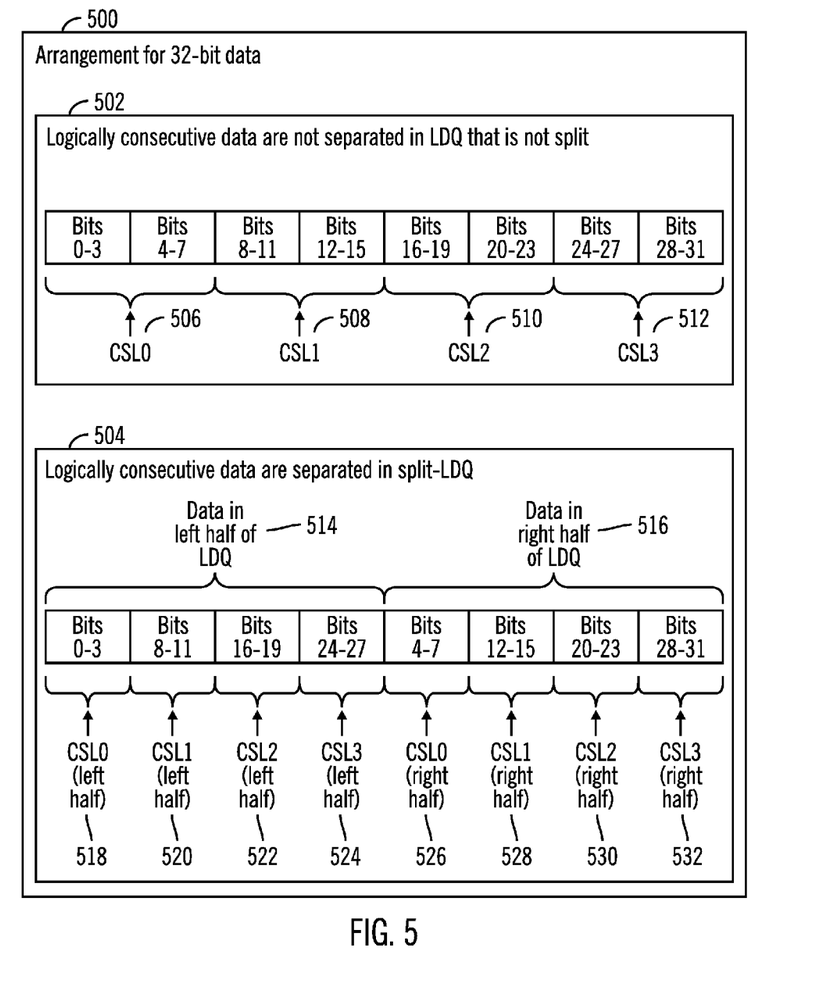
FIG. 5 illustrates a block diagram of a 32 bit data arrangement, in accordance with certain embodiments.

FIG. 5 illustrates a block diagram 500 of an arrangement for 32-bit data, in accordance with certain embodiments. Logically consecutive data are not separated in architectures in which the LDQ is not split (as shown via reference numeral 502). In the block shown via reference numeral 502, of the 32 bits of data (i.e., bits 0-31), the first byte comprising the first 8 bits (bits 0-7) are selected by column select line CSL0 506, the second byte comprising the next 8 bits (bits 8-15) are selected by column select line CSL1 508, the third byte comprising the next 8 bits (bits 16-23) are selected by column select line CSL2 510, and the fourth byte comprising the next 8 bits (bits 24-31) are selected by column select line CSL3 512, where CSL0 506, CSL1 508, CLS2 510, CSL3 512 are four column select lines of the LDQ, where the LDQ is not split. There is no need to separate contiguous bits of data if the LDQ is not split.

In certain embodiments that implement the split LDQ shown in FIG. 4, logically consecutive data are separated into physically two separate halves as indicated in the block shown via reference numeral 504. The first, third, fifth, and seventh nibbles comprising bits 0-3, bits 8-11, bits 16-19, and bits 24-27 of data respectively, are transmitted via the left half 514 of a split LDQ, and the second, fourth, sixth, and eight nibbles comprising bits 4-7, bits 12-15, bits 20-23, bits 28-31 respectively are transmitted via the right half 516 of the split LDQ.

For example, of the 32 bits of data, the first nibble (bits 0-3) is fetched from the left half 514 of the LDQ (includes both top left split-LDQ and bottom left split-LDQ), by column select line CSL0 518 of the left half 514 of the LDQ, and the second nibble (bits 4-7) is fetched from the right half 516 of the LDQ (includes both top right split-LDQ and bottom right split-LDQ) by column select line CSL0 526 of the right half 516 of the LDQ. The third nibble (bits 8-11) is fetched from the left half 514 of the LDQ, by column select line CSL1 520 of the left half 514 of the LDQ, and the fourth nibble (bits 12-15) is fetched from the right half 516 of the LDQ by column select line CSL1 528 of the right half 516 of the LDQ. The fifth nibble (bits 16-19) is fetched from the left half 514 of the LDQ, by column select line CSL2 522 of the left half 514 of the LDQ, and the sixth nibble (bits 20-23) is fetched from the right half 516 of the LDQ by column select line CSL2 530 of the right half 516 of the LDQ. The seventh nibble (bits 24-27) is fetched from the left half 514 of the LDQ, by column select line CSL3 524 of the left half 514 of the LDQ, and the eighth nibble (bits 28-31) is fetched from the right half 516 of the LDQ by column select line CSL3 532 of the right half 516 of the LDQ.

Therefore, FIG. 5 shows certain embodiments in which logically consecutive data are separated to implement DRAM architectures in which the LDQ is physically split into two parts (e.g., halves) and the MDQ is split via switches and placed on both left and right of an array tile.

FIG. 6 illustrates a block diagram 600 that shows an example of an entire MDQ data line (such as a left MDQ or a right MDQ). MDQ data line provides a slow path and a fast path for data, in accordance with certain embodiments. FIG. 6 shows examples of the MDQ data line. Each MDQ includes multiple switches, with one switch per section. Only the switch that corresponds to the section which is being accessed is used for segmenting the MDQ data line at a location adjacent to the section.

If the switch is used for segmenting the MDQ line adjacent to section (1) 602 on the global data bus, then data from one split local data bus moves to the top MDQSA 604 via the slow path 606 of the global data bus, and data from another split local data bus moves to the bottom MDQSA 608 via the fast path 610 of the global data bus. The term "slow path" signifies that the time a signal takes to proceed to the MDQSA along the path of the global data bus is relatively slow compared to the fast path (because the length of the path along the global data bus via which the signal proceeds to the MDSQA is longer than a length of the "fast" path along the global data bus). The term "fast path" signifies that the time a signal takes to proceed the MDQSA along the path of the global data bus is relatively fast compared to the slow path (because the length of the path along the global data bus via which the signal proceeds to the MDSQA is shorter than a length of the "slow" path along the global data bus). Thus data may be rapidly conveyed to at least one of the MDQSAs 604, 608.

However, if the switch is used for segmenting the global data bus adjacent to section (m−1) 612, then the fast path 614 is to the top MDQSA 616 (which is same as MDQSA 604) and the slow path 618 is to the bottom MDQSA 620 (which is same as MDQSA 608). It should be noted that as shown earlier in FIG. 4, that if the segmenting of the global data bus via the switch is adjacent to a selected section, then signals from the BLSA above the selected section follow the path to the top MDQSA whereas signals from the BLSA below the selected section follow the path to the bottom MDQSA. If the selected section is more towards the top MDQSA than the bottom MDQSA then signals from the BLSA above the selected section follow the fast path to the top MDQSA, whereas signals from the BLSA below the selected section follow the slow path to the bottom MDQSA. Similarly, if the selected section is more towards the bottom MDQSA than the top MDQSA, then signals from the BLSA above the selected section follow the slow path to the top MDQSA, whereas signals from the BLSA below the selected section follow the fast path to the bottom MDQSA. If the selected section is equidistant from the top MDQSA and the bottom MDQSA then the time taken by a signal from the BLSA above the selected section to proceed to the top MDQSA is the approximately the same as the time taken by a signal from the BLSA below the selected section to proceed to the bottom MDQSA.

Depending on the location of the section adjacent to which the switch is used to segment the global data bus, one path to an MDQSA may be faster than the other path to another MDQSA (as shown in FIG. 6). Signals that flow though fast paths and slow paths of the memory bank may have to be collected and combined outside the memory bank. In certain embodiments, the term "multiplexing" is used to refer to the selection of one half of signals first and the selection of the other half of signals afterwards, where one half of the signals are selected from one MDQSA (e.g., upper MDQSA 616) and the other half of the signals are selected from the other MDQSA (e.g., lower MDQSA 620). In certain embodiments, the selection of the signals may be via a "physical multiplexing" in which the two halves of signals share one output pin. In alternative embodiments, the selection may be via a "logical multiplexing" in which one half of the signals are enabled first and the other half of the signals are enabled later on. Therefore, in certain embodiments, the signals that proceed via the fast paths and the signals that proceed via the slow paths are multiplexed. In certain embodiments, the multiplexing first enables all the signals that proceed via the fast paths, and then enables all the signals that proceed via the slow paths. As a result, at least the signals that proceed via the fast paths may be processed earlier than the signals of the slow paths. In certain embodiments, if the latency of the slow paths are tolerable, the system may wait until all signals are ready, and multiplexing may be avoided.

Figure 7:
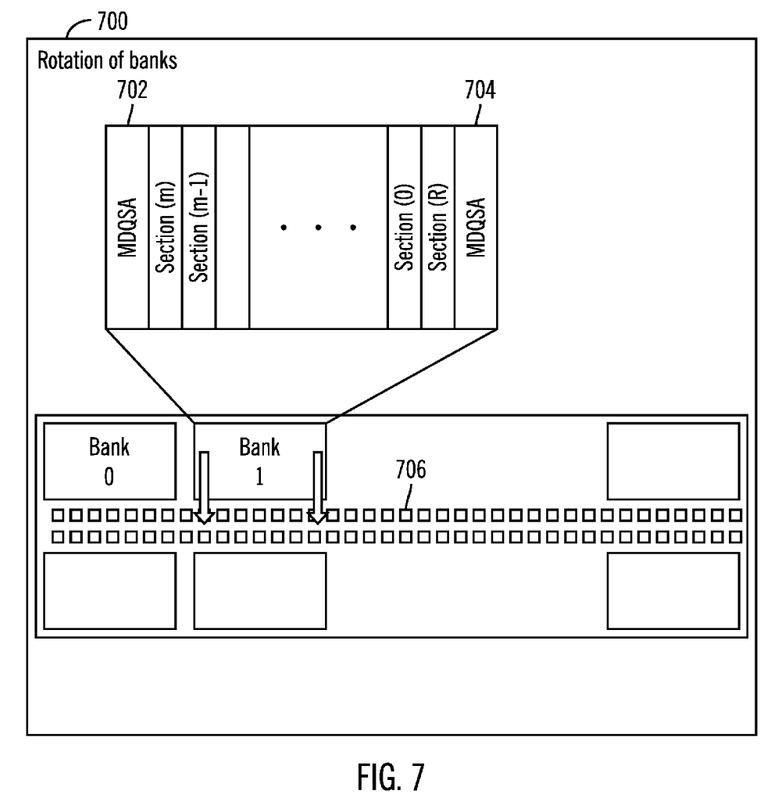
FIG. 7 illustrates a block diagram that shows rotation of banks in a DRAM chip architecture such that both global sense amplifiers may be equally distant to input/output (IO) pads, in accordance with certain embodiments.

FIG. 7 illustrates a block diagram 700 that shows rotation of banks in the architecture so that both MDQSA 702, 704 may be equally distant to 10 pads 706, in accordance with certain embodiments. FIG. 7 shows the change for the chip architecture shown in FIGS. 1, 2 to implement certain embodiments. Since there are two groups of MDQSA in accordance with the embodiments shown in FIG. 4, the two groups of MDQSA 702, 704 are both put close to the 10 PADs 706, by rotating the banks shown in FIG. 1 by 90 degrees, so that both MDQSAs 702, 704 are equally distant to the 10 pads 706. In FIG. 7, the narrower side of the rectangular array of cells are parallel to 10 pads of the memory device but other types of embodiments are possible and the relative physical dimensions of the rectangular array of cells may be different from that shown in FIG. 7.

Therefore, certain embodiments shown in FIGS. 1-7 physically split local data buses, and segment global data buses via switches to double the prefetch width without increasing the number of tracks in the local data buses and global data buses.

The described components and/or operations may be implemented as a method, apparatus or computer program product using standard programming and/or engineering techniques to produce software, firmware, hardware, or any combination thereof. The described operations may be implemented as code maintained in a "computer readable storage medium" for implementation in certain embodiments or for software simulation of a memory chip for design purposes, where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of flowcharts and/or block diagrams may be implemented by computer program instructions.

Figure 8:
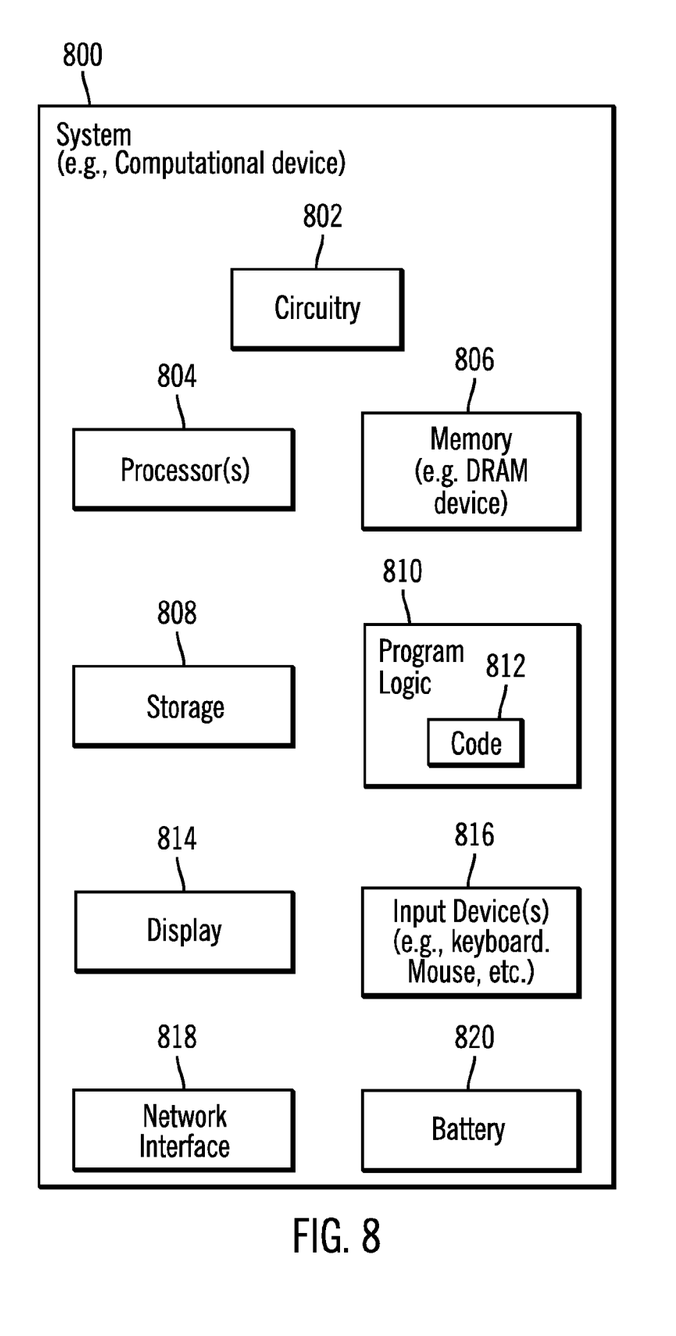
FIG. 8 illustrates a block diagram of a system including a computational device that includes a DRAM device, in accordance with certain embodiments.

FIG. 8 illustrates a block diagram of a system 800 that may include a computational device where a DRAM (designed as per the architecture shown in FIG. 4) is included in the computational device. For example, in certain embodiments the system 800 may be a computer (e.g., a laptop computer, a desktop computer, a tablet, a cell phone or any other suitable computational device) that has a DRAM chip (designed as per the architecture shown in FIG. 4) in the computer. The system 800 may include a circuitry 802 that may in certain embodiments include at least a processor 804. The system 800 may also include a memory 806 (e.g., a DRAM as per the architecture shown in FIG. 4), and storage 808. The storage 808 may include a solid state drive, a disk drive, or other drives or devices including a non-volatile memory device (e.g., EEPROM, ROM, PROM, flash, firmware, programmable logic, etc.). The storage 808 may also include a magnetic disk drive, an optical disk drive, a tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802. The system 800 may also include a display 814 (e.g., an liquid crystal display (LCD), a light emitting diode (LED) display, a cathode ray tube (CRT) display, a touchscreen display, or any other suitable display). The system 800 may also include one or more input devices 816, such as, a keyboard, a mouse, a joystick, a trackpad, or any other suitable input devices). In certain embodiments, the display 814 may be coupled to a memory device comprising the storage 824 and/or the memory 806; a network interface 814 may be communicatively coupled to the processor 804; and a battery 820 may be communicatively coupled to the processor. Other components or devices beyond those shown in FIG. 8 may also be found in the system 800.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

Example 1 is a memory device, comprising: a split local data bus; and a segmented global data bus coupled to local data bus.

In example 2, the subject matter of example 1 further comprises: a first set of tracks of the segmented global data bus configured to receive a first signal from a first part of the split local data bus; and a second set of tracks of the segmented global data bus configured to receive a second signal from a second part of the split local data bus.

In example 3, the subject matter of example 2 further comprises a section select switch in the first or the second set of tracks of the segmented global data bus, wherein the section select switch is configurable to direct a signal from the first or the second part of the split local data bus to either end of the first or the second set of tracks of the segmented global data bus.

In example 4, the subject matter of example 3 includes that the sum of the first set of tracks of the segmented global data bus and the second set of tracks of the segmented data bus is half the number of a prefetch width.

In example 5, the subject matter of example 1 includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 6, the subject matter of example 3 further comprises logic in which based on a section selected by the section select switch, a first signal follows a fast path to one end and a second signal follows a slow path to another end in the first or the second set of tracks of the segmented global data bus.

In example 7, the subject matter of example 1 includes that the memory device comprises at least one of a volatile memory or a non-volatile memory device.

In example 8, the subject matter of example 1 includes that the memory device comprises at least one memory bank.

Example 9 is a method comprising: receiving a signal from a split local data bus; and transmitting the signal to a segmented global data bus coupled to local data bus.

In example 10, the subject matter of example 9, further comprises: configuring a first set of tracks of the segmented global data bus to receive a first signal from a first part of the split local data bus; and configuring a second set of tracks of the segmented global data bus to receive a second signal from a second part of the split local data bus.

In example 11, the subject matter of example 10 further comprises: configuring a section select switch in the first or the second set of tracks of the segmented global data bus, to direct a signal from the first or the second part of the split local data bus to either end of the first or the second set of tracks of the segmented global data bus.

In example 12, the subject matter of example 11 includes that the sum of the first set of tracks of the segmented global data bus and the second set of tracks of the segmented data bus is half the number of a prefetch width.

In example 13, the subject matter of example 9 includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 14, the subject matter of example 11 includes that based on a section selected by the section select switch, a first signal follows a fast path to one end and a second signal follows a slow path to another end in the first or the second set of tracks of the segmented global data bus.

In example 15, the subject matter of example 9 includes that the memory device comprises at least one of a volatile memory or a non-volatile memory device.

In example 16, the subject matter of example 9 includes that the memory device comprises at least one memory bank.

Example 17 is a computational device, comprising: a processor; and a memory device coupled to the processor, the memory device comprising: a split local data bus; and a segmented global data bus coupled to local data bus.

In example 18, the subject matter of example 17 further comprises: a first set of tracks of the segmented global data bus configured to receive a first signal from a first part of the split local data bus; and a second set of tracks of the segmented global data bus configured to receive a second signal from a second part of the split local data bus.

In example 19, the computational device of example 18 further comprises: a section select switch in the first or the second set of tracks of the segmented global data bus, wherein the section select switch is configurable to direct a signal from the first or the second part of the split local data bus to either end of the first or the second set of tracks of the segmented global data bus.

In example 20, the subject matter of example 19 includes that the sum of the first set of tracks of the segmented global data bus and the second set of tracks of the segmented data bus is half the number of a prefetch width.

In example 21, the subject matter of example 17 includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 22, the subject matter of example 19 further comprises logic in which based on a section selected by the section select switch, a first signal follows a fast path to the one end and a second signal follows a slow path to the other end in the first or the second set of tracks of the segmented global data bus.

In example 23, the subject matter of example 17 includes that the memory device is at least one of a volatile memory or a non-volatile memory device.

In example 24, the subject matter of example 17 includes that the memory device comprises at least one memory bank.

In example 25, the subject matter of example 17 comprises one or more of: a display coupled to the memory device; a network interface communicatively coupled to the processor; or a battery communicatively coupled to the processor.

Example 26 is a memory device for sharing of data path, comprising: a split local data bus; and a segmented global data bus coupled to local data bus.

In example 27, the subject matter of example 26, further comprises: a first set of tracks of the segmented global data bus configured to receive a first signal from a first part of the split local data bus; and a second set of tracks of the segmented global data bus configured to receive a second signal from a second part of the split local data bus.

In example 28, the subject matter of example 27 further comprises a section select switch in the first or the second set of tracks of the segmented global data bus, wherein the section select switch is configurable to direct a signal from the first or the second part of the split local data bus to either end of the first or the second set of tracks of the segmented global data bus.

In example 29, the subject matter of example 28 includes that the sum of the first set of tracks of the segmented global data bus and the second set of tracks of the segmented data bus is half the number of a prefetch width.

In example 30, the subject matter of example 26 includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 31, the subject matter of example 28 further comprises logic in which based on a section selected by the section select switch, a first signal follows a fast path to one end and a second signal follows a slow path to another end in the first or the second set of tracks of the segmented global data bus.

In example 32, the subject matter of example 26 includes that the memory device comprises at least one of a volatile memory or a non-volatile memory device.

In example 33, the subject matter of example 26 includes that the memory device comprises at least one memory bank.

Example 34 is a method for sharing of data path, the method comprising: receiving a signal from a split local data bus; and transmitting the signal to a segmented global data bus coupled to local data bus.

In example 35, the subject matter of example 34, further comprises: configuring a first set of tracks of the segmented global data bus to receive a first signal from a first part of the split local data bus; and configuring a second set of tracks of the segmented global data bus to receive a second signal from a second part of the split local data bus.

In example 36, the subject matter of example 35, further comprises: configuring a section select switch in the first or the second set of tracks of the segmented global data bus, to direct a signal from the first or the second part of the split local data bus to either end of the first or the second set of tracks of the segmented global data bus.

In example 37, the subject matter of example 36 includes that the sum of the first set of tracks of the segmented global data bus and the second set of tracks of the segmented data bus is half the number of a prefetch width.

In example 38, the subject matter of example 34 includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 39, the subject matter of example 36 includes that based on a section selected by the section select switch, a first signal follows a fast path to one end and a second signal follows a slow path to another end in the first or the second set of tracks of the segmented global data bus.

In example 40, the subject matter of example 34 includes that the memory device comprises at least one of a volatile memory or a non-volatile memory device.

In example 41, the subject matter of example 34 includes that the memory device comprises at least one memory bank.

Example 42 is a computational device for sharing of data path, the computational device comprising: a processor; and a memory device coupled to the processor, the memory device comprising: a split local data bus; and a segmented global data bus coupled to local data bus.

In example 43, the subject matter of example 42, further comprises: a first set of tracks of the segmented global data bus configured to receive a first signal from a first part of the split local data bus; and a second set of tracks of the segmented global data bus configured to receive a second signal from a second part of the split local data bus.

In example 44, the computational device of example 43 further comprises: a section select switch in the first or the second set of tracks of the segmented global data bus, wherein the section select switch is configurable to direct a signal from the first or the second part of the split local data bus to either end of the first or the second set of tracks of the segmented global data bus.

In example 45, the subject matter of example 44 includes that the sum of the first set of tracks of the segmented global data bus and the second set of tracks of the segmented data bus is half the number of a prefetch width.

In example 46, the subject matter of example 42 includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 47, the subject matter of example 44 further comprises logic in which based on a section selected by the section select switch, a first signal follows a fast path to the one end and a second signal follows a slow path to the other end in the first or the second set of tracks of the segmented global data bus.

In example 48, the subject matter of example 42 includes that the memory device is at least one of a volatile memory or a non-volatile memory device.

In example 49, the subject matter of example 42 includes that the memory device comprises at least one memory bank.

In example 50, the subject matter of example 42, comprises one or more of: a display coupled to the memory device; a network interface communicatively coupled to the processor; or a battery communicatively coupled to the processor.

Example 51 is a system for sharing of data path, the system comprising: means for receiving a signal from a split local data bus; and means for transmitting the signal to a segmented global data bus coupled to local data bus.

In example 52, the subject matter of example 51 further comprises: means for configuring a first set of tracks of the segmented global data bus to receive a first signal from a first part of the split local data bus; and means for configuring a second set of tracks of the segmented global data bus to receive a second signal from a second part of the split local data bus.

In example 53, the subject matter of example 52 further comprises: means for configuring a section select switch in the first or the second set of tracks of the segmented global data bus, to direct a signal from the first or the second part of the split local data bus to either end of the first or the second set of tracks of the segmented global data bus.

In example 54, the subject matter of example 53 further includes that the sum of the first set of tracks of the segmented global data bus and the second set of tracks of the segmented data bus is half the number of a prefetch width.

In example 55, the subject matter of example 51 further includes that the split local data bus comprises a first split local data bus, wherein the memory device comprises a second split local data bus, and wherein a sum of a number of tracks of a first part of the first split local data bus and a number of tracks of a first part of the second split local data bus is half the number of a prefetch width.

In example 56, the subject matter of example 53 further includes logic in which based on a section selected by the section select switch, a first signal follows a fast path to one end and a second signal follows a slow path to another end in the first or the second set of tracks of the segmented global data bus.

In example 57, the subject matter of example 51 includes that the memory device comprises at least one of a volatile memory or a non-volatile memory device.

In example 58, the subject matter of example 51 includes that the memory device comprises at least one memory bank.

What is claimed is:

1. A memory device, comprising:
   a split local data bus;
   a segmented global data bus;
   a decoder; and
   a section select switch corresponding to each of a first set of tracks and a second set of tracks of the segmented global data bus, wherein the section select switch is configurable to direct a signal transmitted via the decoder along a first part or a second part of the split local data bus, to either end of the first set of tracks and the second set of tracks of the segmented global data bus.

2. The memory device of claim 1, wherein:
   the first set of tracks of the segmented global data bus is configurable to receive a first signal from the first part of the split local data bus; and
   the second set of tracks of the segmented global data bus is configurable to receive a second signal from a second part of the split local data bus.

3. The memory device of claim 1, wherein a sum of the first set of tracks of the segmented global data bus and the second set of tracks of the segmented global data bus is half of a prefetch width.

4. The memory device of claim 1, wherein the split local data bus comprises a first split local data bus, wherein the memory device comprises a second split local data bus, and wherein a sum of a number of tracks of a first part of the first split local data bus and a number of tracks of a first part of the second split local data bus is half of a prefetch width.

5. The memory device of claim 1, comprising logic in which based on a section selected by the section select switch, a first signal follows a fast path to one end and a second signal follows a slow path to another end in the first or the second set of tracks of the segmented global data bus.

6. The memory device of claim 1, wherein the memory device comprises at least one of a volatile memory or a non-volatile memory device.

7. The memory device of claim 1, wherein the memory device comprises at least one memory bank.

8. The memory device of claim 1, wherein the decoder is configurable to transmit a first set of signals via a first set of column select lines to select data for transmission along a first part of the split local data bus to one end of a first set of tracks of the segmented global data bus, and a second set of signals via a second set of column select lines to select data for transmission along a second part of split local data bus to one end of a second set of tracks of the segmented global data bus.

9. A method, comprising:
   configuring a section select switch corresponding to each of a first set of tracks and a second set of tracks of a segmented global data bus; and
   directing a signal transmitted via a decoder along a first part or a second part of a split local data bus, to either end of the first set of tracks and the second set of tracks of the segmented global data bus.

10. The method of claim 9, further comprising:
    configuring a first set of tracks of the segmented global data bus to receive a first signal from a first part of the split local data bus; and configuring a second set of tracks of the segmented global data bus to receive a second signal from a second part of the split local data bus.

11. The method of claim 9, wherein a sum of the first set of tracks of the segmented global data bus and the second set of tracks of the segmented global data bus is half of a prefetch width.

12. The method of claim 9, wherein the split local data bus comprises a first split local data bus, wherein a memory device comprises a second split local data bus, and wherein a sum of a number of tracks of a first part of the first split local data bus and a number of tracks of a first part of the second split local data bus is half of a prefetch width.

13. The method of claim 9, the method further comprising:
based on a section selected by the section select switch, a first signal follows a fast path to one end and a second signal follows a slow path to another end in the first or the second set of tracks of the segmented global data bus.

14. The method of claim 9, wherein a memory device comprises at least one of a volatile memory or a non-volatile memory device and includes the segmented global data bus and the split local data bus.

15. The method of claim 9, wherein a memory device comprises at least one memory bank and includes the segmented global data bus and the split local data bus.

16. The method of claim 9, wherein the decoder transmits a first set of signals via a first set of column select lines to select data for transmission along a first part of the split local data bus to one end of a first set of tracks of the segmented global data bus, and a second set of signals via a second set of column select lines to select data for transmission along a second part of split local data bus to one end of a second set of tracks of the segmented global data bus.

17. A computational device, comprising:
a processor; and
a memory device coupled to the processor, the memory device comprising:
a split local data bus;
a segmented global data bus;
a decoder; and
a section select switch corresponding to each of a first set of tracks and a second set of tracks of the segmented global data bus, wherein the section select switch is configurable to direct a signal transmitted via the decoder along a first part or a second part of the split local data bus, to either end of the first set of tracks and the second set of tracks of the segmented global data bus.

18. The computational device of claim 17, wherein:
the first set of tracks of the segmented global data bus is configurable to receive a first signal from the first part of the split local data bus; and
the second set of tracks of the segmented global data bus is configurable to receive a second signal from a second part of the split local data bus.

19. The computational device of claim 17, wherein a sum of the first set of tracks of the segmented global data bus and the second set of tracks of the segmented global data bus is half of a prefetch width.

20. The computational device of claim 17, wherein the split local data bus comprises a first split local data bus, wherein the memory device comprises a second split local data bus, and wherein a sum of a number of tracks of a first part of the first split local data bus and a number of tracks of a first part of the second split local data bus is half of a prefetch width.

21. The computational device of claim 17, comprising logic in which based on a section selected by the section select switch, a first signal follows a fast path to one end and a second signal follows a slow path to another end in the first or the second set of tracks of the segmented global data bus.

22. The computational device of claim 17, wherein the memory device is at least one of a volatile memory or a non-volatile memory device.

23. The computational device of claim 17, wherein the memory device comprises at least one memory bank.

24. The computational device of claim 17, comprising one or more of:
a display coupled to the memory device;
a network interface communicatively coupled to the processor; or
a battery communicatively coupled to the processor.

25. The computational device of claim 17, wherein the decoder is configurable to transmit a first set of signals via a first set of column select lines to select data for transmission along a first part of the split local data bus to one end of a first set of tracks of the segmented global data bus, and a second set of signals via a second set of column select lines to select data for transmission along a second part of split local data bus to one end of a second set of tracks of the segmented global data bus.

* * * * *